United States Patent [19]

Kershaw et al.

[11] Patent Number: 5,448,665
[45] Date of Patent: Sep. 5, 1995

[54] WAVELENGTH-SELECTIVE OPTICAL DEVICE UTILIZING A SELECTIVELY VARIABLE SURFACE ACOUSTIC WAVE GRATING IN A POLAR ORGANIC MATERIAL

[75] Inventors: Stephen V. Kershaw; Stephen A. Cassidy; Philippos Pantelis, all of Suffolk, England; Richard A. Pethrick, Glasgow, United Kingdom; Sandra Gilmour, Pasadena, Calif.

[73] Assignee: British Telecommunications public limited company, London, England

[21] Appl. No.: 204,366
[22] PCT Filed: Aug. 16, 1992
[86] PCT No.: PCT/GB92/01701
§ 371 Date: Jul. 11, 1994
§ 102(e) Date: Jul. 11, 1994
[87] PCT Pub. No.: WO93/06518
PCT Pub. Date: Apr. 1, 1993

[30] Foreign Application Priority Data

Sep. 16, 1991 [GB] United Kingdom ........... 9119734

[51] Int. Cl.⁶ ............................................. G02B 6/34
[52] U.S. Cl. ......................... 385/30; 359/308; 385/1; 385/7; 385/37
[58] Field of Search ............... 385/1, 2, 4, 7, 8, 10, 385/12, 24, 27, 28, 30, 37; 359/305, 308, 321

[56] References Cited

U.S. PATENT DOCUMENTS

| | | | |
|---|---|---|---|
| 3,919,669 | 11/1975 | Hartemann | 385/7 X |
| 4,026,632 | 5/1977 | Hill et al. | 385/28 |
| 4,761,833 | 8/1988 | Epworth | 385/37 X |
| 5,007,705 | 4/1991 | Morey et al. | 385/12 |
| 5,166,992 | 11/1992 | Cassidy et al. | 385/24 |

FOREIGN PATENT DOCUMENTS

| | | |
|---|---|---|
| 0289332 | 11/1988 | European Pat. Off. |
| 2096339 | 10/1982 | United Kingdom . |
| 2180950 | 9/1986 | United Kingdom . |

OTHER PUBLICATIONS

Yennadhiou et al, "D–Fiber Grating Reflection Filters", Optical Fiber Communication Conference, 1990 Technical Digest Series, vol. 1, Conference Edition 22 Jan. 1990, San Francisco, US, p. 27.

Patent Abstracts of Japan, vol. 4, No. 163 (P-36) 13 Nov. 1980 & JP,A,58 111 920 (Ricoh) 29 Aug. 1980.

Patent Abstracts of Japan, vol. 15, No. 227 (C-839) 10 Jun. 1991 & JP,A,03 069599 (Furukawa) 25 Mar. 1991.

Chen et al, "Grating–Assisted Couplers", Optics Letters, vol. 16, No. 4, Feb. 1991, pp. 217–219.

Gilmour et al, "First Demonstration of Saw Propagation in Organic Crystal", Electronics Letters, 12th Mar. 1992, vol. 28, No. 6, pp. 593–594.

Harris et al, "Theory and Design of Periodic Couplers", Applied Optics, vol. 11, No. 10<, Oct. 1972, pp. 2234–2241.

Syms, "Optical Directional Coupler with a Grating Overlay", Applied Optics, vol. 24, No. 5, Mar. 1985, pp. 717–726.

Wilkinson et al, "Optical Fibre Modulator Using Electro–Optic Polymer Overlay", Electronics Letters, 23rd May 1991, vol. 27, No. 11, pp. 979–981.

(List continued on next page.)

*Primary Examiner*—John D. Lee
*Attorney, Agent, or Firm*—Nixon & Vanderhye

[57] ABSTRACT

A wavelength-selective arrangement interacts with optical radiation propagating in a transmission medium. The arrangement includes a selector member made of a polar organic material which exhibits piezoelectric properties, the selector member having an interaction surface for interacting with the radiation. The selector member is provided with structure for propagating surface acoustic waves along the interaction surface so as to create a grating and thereby determine its interacting properties in relation to the wavelength of the radiation, in a selectively variable manner.

11 Claims, 4 Drawing Sheets

OTHER PUBLICATIONS

Yennadhiou et al, a paper given at OFC 1990 in San Francisco entitled "D-Fibre Grating Reflection Filters", 4 pages No Month.

Wagers, "Saw Transduction on Silicon Substrates with $PVF_2$ Films", 1979 Ultrasonics Symposium, pp. 645-648 No Month.

Carome et al, "$PVF_2$ Surface Wave Transducers", 1979 Ultrasonics Symposium, pp. 641-644 No Month.

Sen et al, "Fabrication of Low-Stress Silicon Stencil Masks for ion Beam Lithography", Journal of Vacuum Science Technology B, vol. 7, No. 6, Nov. 1989, pp. 1802-1805.

Kondo et al, "A Nonlinear Optical Organic Crystal For Waveguiding SHG Devices: (−)2-(α-Methylbenzylamino)-5-Nitropyridine (MBANP)", Japanese Journal of Applied Physics, vol. 28, No. 9, Sep. 1989, pp. 1622-1628.

Sherwood, "Molecular Nonlinear Optical Materials", Phil. Trans. Royal Society of London, Part A 1989, 13 pages.

Halfpenny et al, "Optical Materials", date unknown, 6 pages.

Bailey et al, "The Quality and Performance of the Organic Non-Linear Optical Material (−)2-(α-Methylbenzylamino)-5-Nitropyridine (MBA-NP)", Optics Communications, vol. 65, No. 3, Feb. 1988, pp. 229-232.

Bailey et al, "Organic Electro-Optic and Nonlinear Materials", International Journal of Opto-Electronics 1990, vol. 5, No. 2, pp. 89-102.

WAVELENGTH-SELECTIVE OPTICAL DEVICE UTILIZING A SELECTIVELY VARIABLE SURFACE ACOUSTIC WAVE GRATING IN A POLAR ORGANIC MATERIAL

The present invention relates to an optical grating device, for instance for use in wavelength separation, and in particular to in a wavelength-selective filter for use in wavelength demultiplexing in optical communications.

Gratings are known in optical technology, particularly for communications, for instance in reflecting optical radiation in a selective manner. The pitch of a grating can introduce a wavelength-discriminatory element into the grating's interaction with optical radiation.

It is also known to modulate the amplitude of an optical signal by using an electro-optic overlay to modify the wavelength or wavelengths of optical radiation travelling in a waveguide. Such an arrangement is disclosed in a paper entitled "Optical Fibre Modulator Using Electro-Optic Polymer Overlay", published in Electronic Letters on 23rd May 1991, Volume 27 number 11, by M. Wilkinson et al. The electro-optic overlay comprises a polymer material applied to a polished half-coupler block. By varying the voltage applied across the electro-optic overlay, its refractive index can be changed and the wavelengths coupled out of a waveguide in the block into the overlay can be altered. This provides amplitude modulation in the waveguide in the block at selected wavelengths.

It has now been found, in making the present invention, that it is possible to produce a grating, for use in optical technology such as communications, whose pitch is not only comparable to the wavelength of optical radiation in relevant propagation media such as optical fibres, but which is also controllably variable.

Such a grating might be applied for instance as a tunable filter, for selecting a wavelength or wavelengths of optical radiation propagating in a transmission medium from a range of available wavelengths. A tunable filter of this sort might be particularly useful in co-operation with a receiver receiving an output from an optical communications fibre carrying a plurality of signals which are wavelength multiplexed. In order to demultiplex the signal so that optical radiation reaching a particular receiver as an output from that fibre should have a carrier wavelength or wavelength range dedicated to that receiver, the filter could be used to select only the wavelength required. This situation might arise for instance at a customer receiver in an optical communications network, where that customer has been allocated a wavelength slot in a wavelength division multiplexed system.

A tunable filter can offer a number of advantages in this situation. Most obviously, perhaps, a communications fibre output can be "tuned" to suit any one of a plurality of different receiver criteria, and subsequently "retuned" for use in other circumstances. Thus, effectively, the associated receiver is tuned and retuned so that it can be for instance modified from receiving a first allocated wavelength to receive a second, different allocated wavelength.

The present invention provides a wavelength-selective arrangement for interacting with optical radiation propagating in a transmission medium, the arrangement comprising a selector member made of a polar organic material which exhibits piezoelectric properties, the selector member having an interaction surface for interacting with said radiation, the selector member being provided with means for propagating surface acoustic waves along the interaction surface so as to create a grating and thereby determine its interacting properties in relation to the wavelength of said radiation, in a selectively variable manner.

Although such a grating might potentially be provided on inorganic material, such as lithium niobate, the low permittivity and elastic constants of a polar organic material can offer a potential improvement in electromechanical coupling coefficient of a factor of the order of ten times that of lithium niobate. Moreover, the surface acoustic waves propagate at significantly lower velocities, such that for a given acoustic grating pitch, drive frequencies will be proportionately less. A polar organic material is a covalently-bonded carbon-based molecule which contains a non-uniform distribution of electron density, and such a material which can be used in the invention must exhibit piezoelectric properties, that is to say the molecule of such a material must be capable of being organised into a non-centrosymmetric structure. A molecule of this type will usually contain polar entities, and may exhibit extended hydrogen bonding in the solid state. This type of molecule may also, but not necessarily will be, a second order, non-linear optical molecule and, as such, will contain donor and acceptor groups and a conjugated electronic structure.

Advantageously, a single crystal constitutes the selector member. The polar organic crystal might be (—)-2α-methylbenzylamino-5-nitropyridine (MBANP), a related molecule, urea, a substituted urea, an isocyanate, methylnitro-aniline (MNA), or a molecule such as benzophenone where distortion of the molecular structure under force can generate re-distribution of the electronic structure.

Preferably, the pitch of the grating can be determined by selecting a drive frequency supplied to an inter-digital transducer (IDT), or a pair of inter-digital transducers, generating said surface acoustic waves along the interaction surface. It has been found possible to grow crystals of MBANP in particular, sufficiently large to accommodate the interdigital transducer(s) used to establish surface acoustic waves (SAW) therein. Where there are two IDTs, the use of this material also ensures a sufficiently-large gap between the IDTs for propagation of the SAWs to produce a suitable grating length. At low acoustic frequencies (5–10 MHz) the acoustic loss of such materials is better than 15 dB/cm, and this allows a large acoustic-optic interaction region. That is, it has been found possible to grow crystals of acceptable quality and up to for instance 5 cm long.

The invention also provides an optical filter comprising an optical radiation transmission medium and a wavelength-selective arrangement as defined above, wherein the interaction surface is placed at least partially within the region in which an evanescent optical field would be created by optical radiation propagating in the transmission medium, so as to reflect radiation propagating in the transmission medium in a wavelength selective manner.

Advantageously, the filter further comprises a half-coupler block, the transmission medium being incorporated in the half-coupler clock.

In a preferred embodiment, the half-coupler block is a polished half-coupler block, and a curved waveguide constitutes the transmission medium. In this case, the curved waveguide is constituted by an optical fibre whose cladding is partially removed in the region of the surface of the half-block which, in use, is adjacent to the interaction surface of the selector member. Alternatively, the half-coupler block may be a D-fibre half-coupler block, and a D-fibre may constitute the transmission medium, the D-fibre being positioned within the half-coupler block in such a manner that the flat of the D-fibre is substantially flush with that surface of the block which, in use, is adjacent to the interaction surface of the selector member.

It is advantageous, whatever material is used, that the piezoelectric properties are suitably oriented with respect to the crystal cleavage plane so that multiple devices can be produced from one crystal by simple cleavage and polishing as appropriate.

Embodiments of the present invention are capable of providing particularly good wavelength selection. For instance, by using the arrangement as an overlay, with the interaction surface able to interact with the evanescent field of the optical radiation propagating in the transmission medium, it is possible to reflect only a selected wavelength (or band of wavelengths) so that it effectively reverses propagation direction in the transmission medium.

The surface acoustic waves may be used to produce the grating in known manner by changes in refractive index of the material. By varying the frequency of the surface acoustic waves, the pitch of the grating might be altered, consequently altering the wavelength or wavelengths of radiation coupled into, or out of, the transmission medium.

Embodiments of the present invention are particularly convenient since they can be applied in the manner of known technology, for instance as an overlay. Where this is the case, no non-standard modification has to be made to components already in the primary signal-carrying path of an optical communications network.

(It should be noted that the use of terms such as "light" and "optical radiation" in this specification should be taken, unless the context clearly dictates otherwise, to include electromagnetic radiation of a wavelength suitable for any relevant use, whether visible or outside the visible range, and in the optical communications field will generally include wavelengths at which transmission media have been found particularly suitable, such as (0.8, 1.3 or 1.55 $\mu$m.)

Embodiments of the invention will now be described, by way of example only, with reference to the accompanying drawings, in which.

Figure 1:
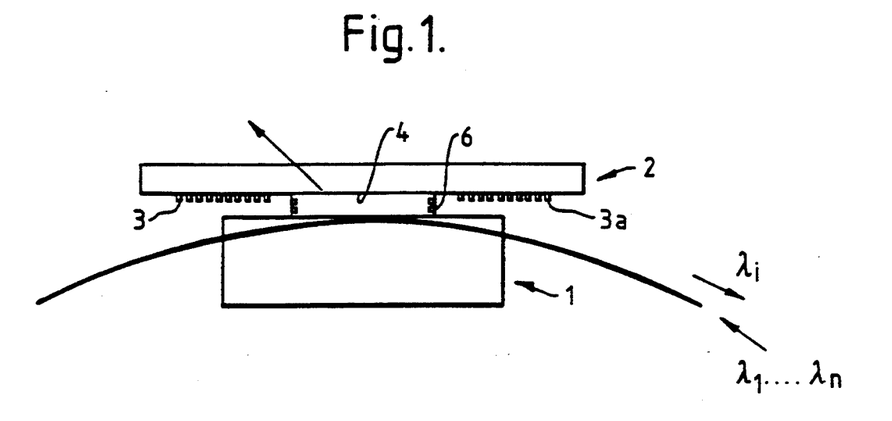
FIG. 1 is a cross-section of an acousto-optic reflective filter arrangement, comprising an overlay and a half-coupler block, for selecting a wavelength to be reflected at the block, according to an embodiment of the present invention.
Figure 2:
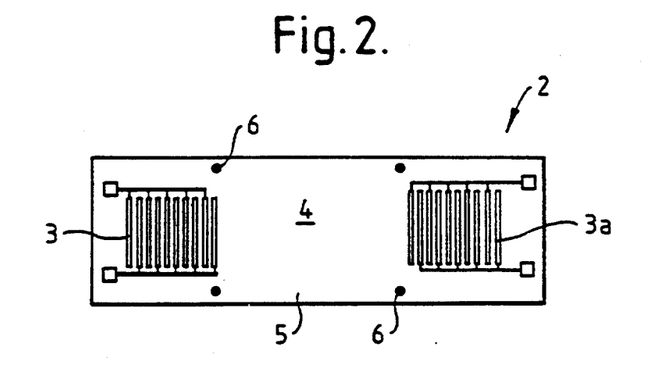
FIG. 2 is a view from below of the overlay of FIG. 1.
Figure 3:
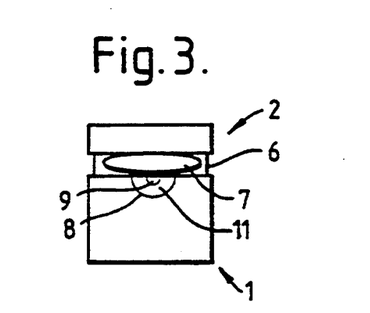
FIG. 3 is a cross-section of the filter, the cross-section being taken on a line normal to that of the cross-section of FIG. 1.

Referring to the drawings, FIGS. 1 to 3 show a reflective filter comprising a polished half-coupler block 1 with a single crystal overlay 2. The overlay 2 comprises a single crystal 5 (see FIG. 2) of MBANP whose lower (interaction) surface 4 is either cleaved or cut, and polished as necessary to achieve a sufficiently flat surface for SAW propagation without unacceptable power losses. This type of crystal exhibits piezoelectric properties. The interaction surface 4 is provided, towards one end, with a drive IDT 3 and, towards the other end, with an output IDT 3a. Electrical leads (not shown) are associated with the IDTs 3 and 3a. Metal film spacers 6 are provided adjacent to the inner ends of the two IDTs 3 and 3a to offset the overlay 2 with respect to the half-coupler block 1.

The overlay 2 is of substantially the same width as the half-coupler block 1 but somewhat longer. The half-coupler block 1 is of known type, comprising a block of material holding a curved waveguide 8 such as a single mode optical fibre having a core 9 and a cladding 11. The fibre 8 is convex adjacent to the upper surface of the block 1, that surface and part of the cladding 11 having been polished back so as to expose, or nearly expose, the core 9 of the fibre 8. It is at this exposed, or nearly exposed, region of the core 9 that the evanescent optical field of the fibre 8 can be accessed; and, as a consequence, optical radiation can be coupled in or out, or reflected.

Referring to FIG. 3, when the overlay 2 is arranged in conjunction with a half-coupler block 1 ready for use, an index matching material 7 such as water, or silicone oils, may be applied between the overlay 2 and the block 1. The intention of using an index matching material 7 is to weaken the guidance of light propagating in the fibre 8 adjacent to the grating, so as to improve the optical interaction between the overlay 2 and the light propagating in the fibre. However, in practice, the presence of any material on the surface of the crystal 5 in which the surface acoustic waves are to propagate is likely to attenuate the surface acoustic waves to at least some degree. The use of an index matching material 7 will, therefore, represent a compromise between improvement in optical interaction and surface acoustic wave attenuation.

An alternative to the use of index matching material 7, is to use simply an air gap. However, in this case, to achieve the necessary optical interaction, the spacers 6 would require to be designed such that the separation between the overlay 2 and the block 1 is less than the depth of the evanescent field associated with optical radiation propagating in the curved fibre 8, this evanescent field depth being of the order of 100 nm. It might also be noted that it may not be necessary to provide separate spacers 6, the construction of the IDTs 3 and 3a potentially providing the same function.

Once the overlay 2 is assembled on the block 1, the general principle involved in wavelength selection by means of an acousto-optic overlay is that, where a range of wavelengths λ ... $λ_n$ is propagating in the fibre 8, it is possible to reflect only a selected wavelength $λ_i$ back along the fibre. This means that the overlay 2 acts as a reflection filter in respect of the fibre 8, the only wavelength (or wavelength band) reflected at the grating, being $λ_i$. The reflection characteristic is determined by the nature of the fibre 8 and the half-coupler block 1, as well as by the relative position and nature of the grating formed at the interaction surface 4 of the overlay 2. Once the reflection characteristic has been established, by driving the IDTs 3 and 3a at different drive frequencies, the pitch of the grating so produced can then be selected to tune the grating to provide that reflection characteristic at a wavelength or wavelength band that is required.

It is possible to establish the reflection characteristic experimentally simply by spectrum analysing the reflected optical radiation in the fibre 8. Alternatively, the reflection characteristic can be calculated, according to theory. Work of this type is already quite widely known in respect of fixed gratings, and is described in a paper "D-fibre grating reflection filters" presented at the Optical Fibre Conference in San Francisco, 1990.

The design details and material of the overlay 2 will now be described in more detail. The crystal 5, which forms the basis of the overlay 2 comprises a monoclinic crystal with symmetry point group m. Such crystals can be grown from a methanol solution using a temperature lowering technique. The behaviour of the material concerned, (−)-2α-methylbenzylamino-5-nitropyridine (MBANP), is discussed in the publication; IBM Research Report, R J 5237 (54077) by TWEIG R. J. and DIRK C. W., published in July 1986. The growth techniques involved in growing large single crystals, for instance of the order of $5 \times 3 \times 2$ cm$^3$ are disclosed in the publication "CRYSTAL GROWTH", published by Pergamon (New York), second edition, editor B Pamplin, authors HOOPER R. M., MCARDLE B. J., NARANG R. S., and SHERWOOD J. N., published in 1985. (It should be noted, however, that large crystals require considerable care, and growth cannot be carried out quickly.) The material produced has a relatively low melting point of 80° C. and a density of 1.3123 gcm$^{-3}$ at 25° C. This compares with a calculated density of 1.3154 gcm$^{-1}$. The difference can be attributed to defects introduced for instance during cutting and polishing processes. The crystal quality can be assessed by X-ray topography, and has been found to be only slightly poorer than for both lithium niobate and quartz.

To produce a crystal 5 for use in the overlay 2 of the present invention, a slice of MBANP, which might be approximately 2 mm thick, can be cleaved from a bulk single crystal, in the (001) plane. The cleavage plane will provide the interacts on surface 4 of the overlay 2. The polar axis of molecules in this material is then parallel to the propagation direction [010] of the surface acoustic waves in the crystal 5.

It is necessary that the interaction surface 4 of the crystal 5 should not introduce undue losses between the coupler 1 and the overlay 2. Although the cleavage plane described will produce a sufficiently flat surface, should any other cleavage plane be used, or should the crystal instead be cut, it may be necessary to polish the interaction surface 4 to achieve an acceptable surface.

The surface 4 should have few defects per mm$^2$ at an acoustic wavelength of 300 μm, but will require to be of higher quality as that wavelength is decreased. To achieve a good surface, which must also be good enough not to introduce an unacceptable optical loss between the fibre 8 and the overlay 2, it may be possible to polish the surface, using fine grits. However, there is a tendency for the grits to become embedded, and an alternative technique is solvent polishing, using for instance a 25% solution of methanol in water, impregnated in a pad. This particular solution has an advantage in that methanol acts relatively slowly on MBANP.

To put the IDTs 3 and 3a in place, a shadow mask technique is used. The low melting point of MBANP, its solubility in many polar organic solvents, and its moderate reactivity with strong oxidising agents, imposes quite serious constraints on any photolithographic processing used to pattern surface electrode structures. The IDTs 3 and 3a comprise gold, and are evaporated onto the interaction surface 4 of the crystal 5 through a patterned metal foil stencil.

It might be noted that the use of a patterned metal foil stencil is not essential. A silicon membrane could alternatively be used. The metal stencil has drawbacks in that, particularly at smaller dimensions, the stencil quickly loses features with repeated use. An alternative technique might be photolithography at such smaller dimensions, or other suitable techniques. Also, although gold IDTs are described, this material might be replaced by other suitable materials such as aluminium, or by a combination of materials, for instance including titanium for improved adhesion.

Firstly, the electrode fingers are laid down to a thickness of 56 nm, and then much thicker contact bars are subsequently overlaid, to a depth of 100 nm. The centre-to-centre distance between the IDTs 3 and 3a is 21.24 mm, and they are arranged such that the surface acoustic wave produced thereby propagates in the [010] direction of the MBANP crystal 5.

Each IDT 3, 3a has five pairs of fingers with a width and spacing of 75 μm, corresponding to a response peak at a drive wavelength of 300 μm. However, by using a range of drive frequencies, centred on an equivalent drive wavelength of 300 μm, the full width of the response peak of such IDTs can be exploited. A tuning range of typically up to 15% of the centre frequency may be achieved with simple IDT patterns with small numbers of fingers. The SAW frequency range which can be generated by particular IDT designs is a known area of technology, and it is possible to produce selected frequency response characteristics, such as a particularly square frequency response. This can be done by weighting the fingers, by shortening selected fingers (apodising). In the present application, however, the most desirable response is most likely to be a slightly broader frequency response, this being better achieved by the use of fewer IDT fingers rather than a greater number. Thus, the number of pairs of fingers determines the bandwidth of the frequency response, the larger the number of fingers the narrower the bandwidth.

The relative dimensions described above of the overlay and the block 1 are not essential. However, it is important that the area of the interaction surface 4 which carries plane surface acoustic waves should be able to interact with the evanescent field of the half-coupler block 1. Usually, a plane surface acoustic wave propagates close to the drive IDT 3, for instance within the length of a finger of the IDT away from it. At greater distances, there is a tendency for end effects to come into play. a finger of the IDT away from it. At greater distances, there is a tendency for end effects to come into play.

Another constraint on the relative dimensions of the overlay 2 and The half-coupler block 1 is that, in order to affect light in the half-coupler block as required, the plane surface acoustic wave should be able to propagate so as to create a grating over at least a minimum distance. (The creation of such a grating is a known technique, relying on changes in refractive index in a material caused by an acoustic wave, and the criteria therefor are not further discussed herein.) The IDTs 3 and 3a are, therefore, arranged so that a plane surface acoustic wave provides a grating over said minimum distance, which, in optical communications using light of a wavelength of the order of 1.3 μm or 1.55 μm, will generally be required to be of the order of one or a few mm long in the propagation direction, in order to facilitate interaction with the radiation in the half-coupler block 1 by the overlay 2 via the grating.

Figure 4:
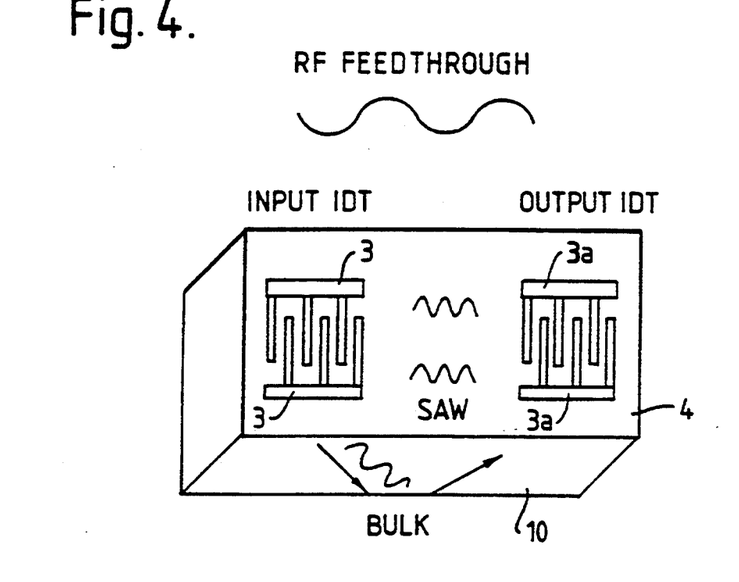
FIG. 4 shows a test arrangement for analysing waves propagating in a crystal of the material of the overlay of FIGS. 1 to 3.

FIG. 4 shows an experimental arrangement established to categorise surface acoustic waves propagating in an MBANP crystal of the type which would be used in an overlay 2 as described above. IDTs 3 and 3a are mounted on the upper surface of a slice 10 of MBANP. The slice 10 is approximately 2 mm thick, cleaved in the (001) plane from a bulk single crystal. The IDTs 3 and 3a are of gold and are evaporated onto the surface through a patterned metal foil stencil. Again, the electrode fingers are laid down initially at 56 nm thick, and then much thicker contact bars are subsequently overlaid at 100 nm thick. The centre-to-centre distance between the IDTs 3 and 3a is 21.24 mm, and the surface acoustic wave propagation is in the [001] direction. Each IDT 3, 3a has three pairs of fingers with a width and spacing of 75 μm, corresponding again to a peak response wavelength of 300 μm.

To reduce electromagnetic feedthrough from lead wires or the like, a grounded aluminium partition (not shown) is positioned above the organic substrate, between the IDTs 3 and 3a, and the whole assembly is mounted in a screened enclosure. However, in practice, such problems as radio frequency feedthrough can be avoided by production packaging involving techniques such as dual-in-line packaging with co-planar and well-screened leads to the IDTs. These are standard layout techniques, for instance, in integrated circuit and printed circuit board technology.

Figure 7:
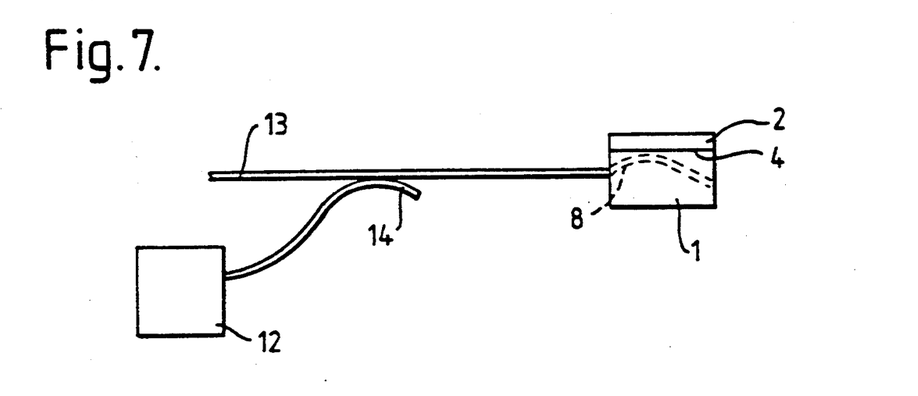
FIG. 7 is a schematic representation of a receiver in a WDM optical communications system comprising an embodiment of the present invention.

Referring to FIG. 7, an optical receiver 12 receives a tuned output from an optical fibre 13 carrying a WDM signal, by means of an arrangement according to the present invention acting as a reflection filter. Therefore, the WDM signal propagating in the fibre 13 is directed to the half-coupler block 1, or to a "D"-profile fibre, having an overlay 2. As described above, IDTs (not shown) are used to generate a grating in the interaction surface 4 of the overlay 2, such that a selective wavelength is reflected back along the fibre 13. The selected wavelength can then be picked off by a coupler 14 and directed to the receiver 12.

Figure 5:
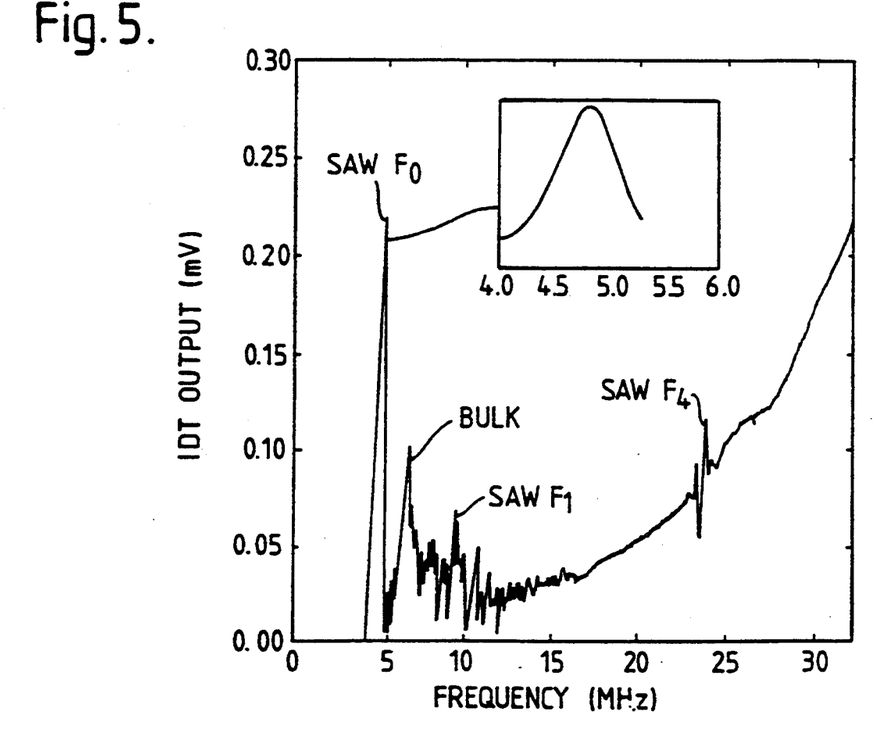
FIG. 5 shows an output frequency spectrum with respect to an output IDT of the test arrangement shown in FIG. 4.
Figure 6:
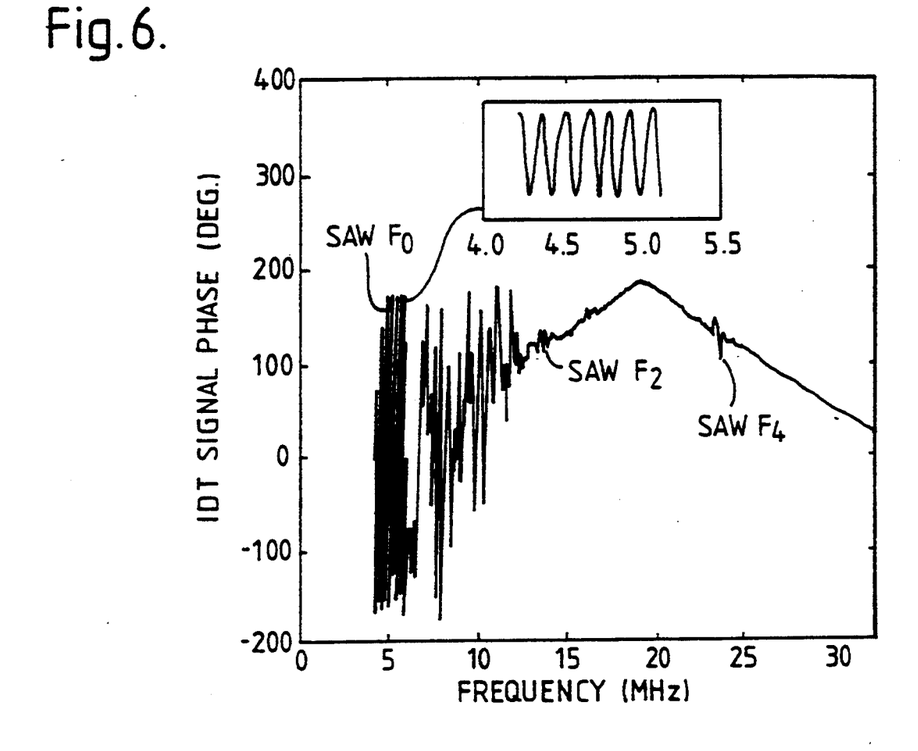
FIG. 6 shows phase differences measured over a frequency range, between the signal at the output IDT and the signal applied to the input IDT of the test arrangement of FIG. 4.

Referring to FIGS. 5 and 6, the magnitude and phase characteristics of the received SAW are both measured over a drive frequency range of 0 to 32 MHz, for a 1 volt input, using a Schlumberger 1260 impedance analyser.

Referring to FIG. 5, the magnitude of the surface acoustic wave signal received at the output IDT 3a is plotted against the frequency of the signal input at the drive IDT 3. The first maximum $F_0$ can be seen at around 4.7 MHz, this being equivaient to a surface acoustic wavelength of 300 μm. A maximum response would be expected at this wavelength in view of the finger separation and width of the IDTs 3 and 3a, both measurements being 75 μm. Subsequent curve fitting indicates that the peak is well described by a $sinc^2$ function with $f^{max}=4.723$ MHz, and amplitude=0.19 mV. This value of $f^{max}$ corresponds to an acoustic velocity of 1416 ms$^{-1}$.

There are several alternative propagations mechanisms which should be discounted before it can be accepted that the 4.723 MHz response is due to a surface acoustic wave. These are radio frequency feedthrough, bulk acoustic waves and surface skimming bulk waves.

In order to check that radio frequency feedthrough is not occurring, a phase check is made, looking at the phase difference between the waveforms on each half of the output IDT 3a (these results not being shown). The output response at 4.723 MHz is sampled differentially on a two-channel analogue oscilloscope. A phase difference of 180° between the wave forms on each half of the output IDT is observed. This indicates that there is no radio frequency feedthrough.

No discernible phase difference would be expected for an electromagnetic wave, since the electromagnetic wavelength in the frequency range in question is several orders of magnitude greater than the IDT dimensions.

It can be seen in FIG. 5, however, that there is a small electromagnetic/noise contribution to the received signal of a few μV at low frequencies rising to just over 200 μV at 32 MHz.

In order to check for the presence of bulk acoustic waves, it is possible to check the effective path length of the acoustic waves transmitted between the IDTs 3 and 3a. That is, the period with which the phase varies in the vicinity of the fundamental acoustic peak $F_0$ at 4.7 MHz can be used to determine the effective path length. The path length in the case of a bulk wave will always exceed the physical IDT spacing, that is, the distance between the drive IDT 3 and the output IDT 3a.

Writing the path length as l the frequency separation of adjacent phase maxima (separated by 720°) as Δf, and the SAW velocity as $v^s$, we have:

$$l = \frac{2v^s}{\Delta f}$$

Referring to FIG. 6, phase data from the frequency range spanning the fundamental peak are fitted to a simple sine function from which a value of Δf=133.5 KHz is obtained. The calculated path length is 21.21 mm, compared with the actual centre-to-centre distance between the IDTs 3 and 3a of 21.24 mm, confirming that the acoustic wave follows the shortest path available, that is along the crystal surface.

With regard to surface skimming bulk waves, the velocity would be that of the appropriate shear component. In contrast, a surface acoustic wave displaces material in two directions simultaneously. The SAW propagation velocity is related to the slow bulk shear velocity component, and typically it is found that the latter is around 1.1 times larger than the SAW velocity. Bulk acoustic velocities have been measured elsewhere. For the relevant direction of propagation in the present case, the relevant slow bulk shear velocity is 1558 ms$^{-1}$. The ratio between this and the calculated acoustic velocity of 1416 ms$^{-1}$, mentioned above, is in good agreement with the assertion that the 4.723 MHz peak is due to a surface acoustic wave rather than to a surface skimming bulk wave. $F_2$ and $F_4$ at 9.5 MHz and 23.6 MHz respectively, harmonics ($F_2$ and $F_4$) are also evident in the phase response shown in FIG. 6. In the case of the harmonic ($F_4$) at 23.6 MHz, the radio frequency feedthrough is somewhat greater than the surface acoustic wave, and so the harmonic is seen as an amplitude and phase ripple due to interference between the two signal sources. The slow phase variation at high frequencies is due to radio frequency feedthrough, which becomes more severe as the frequency increases.

There is also a feature at around 6.6 MHz which is acoustic in nature, but is not related to the fundamental or harmonics in frequency. This frequency corresponds to an effective wave velocity of 1984 ms$^{-1}$, probably arising largely from the 2098 ms$^{-1}$ b-axis bulk shear velocity component.

Summing up the above test results, surface acoustic waves are generated and detected in an organic crystal. Alternative mechanisms of signal propagation between the drive IDT 3 and the output IDT 3a, including radio frequency feedthrough and surface skimming bulk acoustic waves, are discounted, and bulk acoustic waves accounted for. The measured SAW velocity, 1416 ms$^{-1}$ is less than half that in lithium niobate.

The structure used in the rest arrangement is fabricated by a relatively simple method of patterning IDT structures, and so avoids processing problems associated with poor electrode adhesion (as can occur with photolithographic techniques for these materials) and low substrate melting point.

Generally, the arrangement of FIGS. 1 to 3 will function as a reflection filter if there is relatively weak interaction between the grating and the evanescent field associated with the fibre 8. It may be necessary to have interaction between the grating and the evanescent field associated with the fibre 8. It may be necessary to have a relatively long interaction length between the grazing and the evanescent field. Should a half-block coupler not be sufficient in length, since a curved fibre therein only passes close to the surface of the block for a relatively short distance, then a waveguide such as a "D"-profile optical fibre might be substituted. As such a waveguide is straight, it is relatively easy to increase the interaction length between a grating and the evanescent field of radiation propagating in the waveguide. This type of arrangement will now be described with reference to FIGS. 8 and 9.

Figure 8:
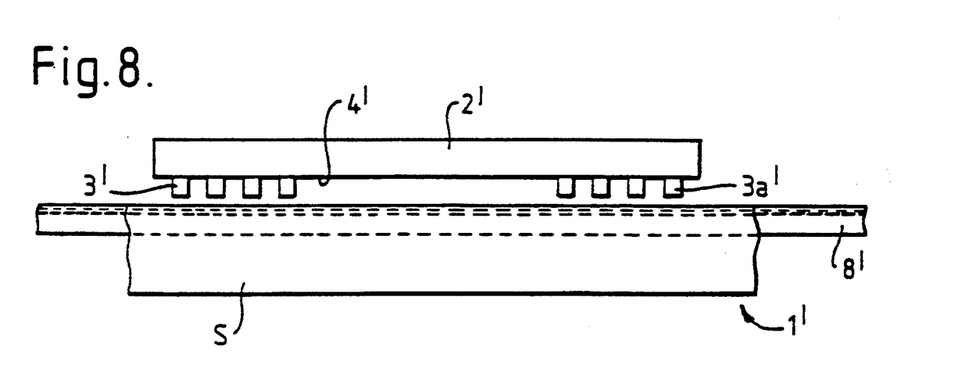
FIG. 8 is a cross-section of an acoustic-optic reflective filter arrangement comprising an overlay and a D-fibre half-coupler block.
Figure 9:
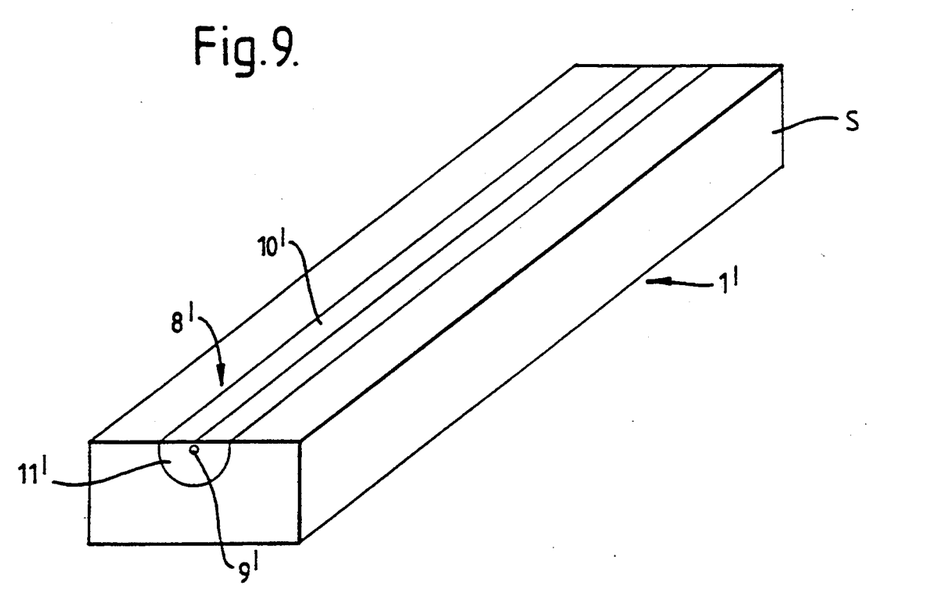
FIG. 9 is a perspective view of the D-fibre half-coupler block of the arrangement of FIG. 8.

The embodiment of FIGS. 8 and 9 is a modification of that of FIGS. 1 to 3, so like (but primed) reference numerals will be us ed for like parts, and only the modifications will be described in detail. In this embodiment, a reflective filter comprises a D-fibre half-coupler block 1' and an overlay 2' constituted by a single crystal 5' of MBANP. As with the earlier embodiment, the lower surface 4' of the crystal 5' is prepared, as necessary, to provide an interaction (coupling) surface. A drive IDT 3' is provided at one end portion of the interactive surface 4', a second IDT 3a' being provided at the other end portion. The second IDT 3a' can be either a drive IDT or an output IDT. The IDTs 3' and 3a' are formed in a similar manner to the IDTs 3 and 3a of FIGS. 1 to 3. Here, however, each IDT 3', 3a' has two pairs of fingers.

The D-fibre half-coupler block 1' comprises a single mode D-fibre 8' embedded in a thermoplastics substrate S. The fibre 8' has a core 9', a flat surface 10' and a cladding 11'. The block 1' is made by heating the substrate 7', and then pressing the fibre 8' into the substrate S until its flat surface 10' is flush with the upper surface of the substrate. Thus, the core 9' is exposed, or nearly exposed, over the entire length of the block 1', so that the evanescent optical field of the fibre can be accessed over a substantial interaction length. As with the embodiment of FIGS. 1 to 3, an index matching fluid (not shown) can be applied between the overlay 2' and the block 1'. Here again, the use of an index matching fluid represents a compromise between improvement in optical interaction and surface acoustic wave attenuation. Moreover, it would again be possible to use a simple air gap instead of the index matching fluid.

The reflection filter of FIGS. 8 and 9 operates in a similar manner to that of FIGS. 1 to 3, and has the additional advantage of increased interaction length.

Various modifications could be made to the arrangements described above. For instance, as described, the surface acoustic waves transmitted in the overlay 2 or 2' are travelling waves, being input at the drive IDT 3 or 3' and output at the output IDT 3a or 3a'. However, the output IDT 3a or 3a' could be replaced by a reflector, so that a standing surface acoustic wave is set up in the crystal. Alternatively, the output IDT 3a or 3a' could be left out altogether or used as a second drive IDT.

The polar organic crystal used in the overlays is described above as being MBANP. However, other organic crystals may be suitable, for instance urea, substituted ureas, isocyanates, methyl-nitro-aniline (MNA), or molecules such as benzophenone where distortion of the molecular structure under force can generate redistribution of the electronic structure.

Although, as described above, an embodiment of the invention might comprise a reflection filter, other applications for a tunable grating of the type described might be found. For instance, a tunable grating might be used to perturb (match) the spatial beat frequency of a coupler such as planar waveguide coupler, to control the output arm of the coupler to carry optical radiation.

The arrangement of the invention could also be used to realise low frequency time division multiplexing (TDM) by applying pulsed bursts of radio frequency (RF) power to the input and output IDTs simultaneously. This would lead to the formation of a transient stationary grating structure for the duration of the overlap between the two resulting counter-propagating SAW disturbances. The principal limitation to this approach is the time delay for the SAWs to propagate to the acousto-optic interaction region (typically of the order of 1–10 $\mu$s), and the length of time taken for the overlap to pass, this latter period being determined by the length of the acoustic grating required to provide an adequate grating reflectivity. More complex transient surface wave disturbances may be produced using alternative drive waveforms (e.g. pulse trains). In general, the profile of the acoustic disturbance will be given by the convolution of the two input signals. Moreover, the transmitted acoustic wave may be further shaped by the statistical weighting (length) of the IDT electrodes. This technique, commonly known as apodising, is a procedure often used in the design of SAW filters (see Campbell C, "Surface Acoustic Wave Devices and Their Signal Processing Applications", Acad. Press, NY, 1989).

The IDTs described above have finger thickness 56 nm. This is probably an upper limit on finger thickness in the arrangement described, since the fingers tend to load the interaction surface 4 of the organic crystal. The spacing between the fingers of the IDTs can also be varied, but is limited by the lithographic techniques used, probably to about 0.5 μm.

We claim:

1. A wavelength-selective arrangement for interacting with optical radiation propagating in a transmission medium, the arrangement comprising a selector member made of a polar organic material which exhibits piezoelectric properties, the selector member having an interaction surface for interacting with said radiation, the selector member being provided with means for propagating surface acoustic waves along the interaction surface so as to create a grating and thereby determine its interacting properties in relation to the wavelength of said radiation, in a selectively variable manner.

2. An arrangement as claimed in claim 1, wherein a single crystal constitutes the selector member.

3. A arrangement as claimed in claim 2, wherein said crystal comprises MBANP.

4. An arrangement as claimed in claim 1, wherein the pitch of the grating can be determined by selecting a drive frequency supplied to an inter-digital transducer, or a pair of inter-digital transducers, generating said surface acoustic waves along the interaction surface.

5. An optical filter comprising an optical radiation transmission medium and a wavelength-selective arrangement as claimed in claim 1, wherein the interaction surface is placed at least partially within the region in which an evanescent optical field would be created by optical radiation propagating in the transmission medium, so as to reflect radiation propagating in the transmission medium in a wavelength selective manner.

6. A filter as claimed in claim 5, further comprising a half-coupler block, the transmission medium being incorporated in the half-coupler block.

7. A filter as claimed in claim 6, wherein the half-coupler block is a polished half-coupler block, and a curved waveguide constitutes the transmission medium.

8. A filter as claimed in claim 7, wherein the curved waveguide is constituted by an optical fibre whose cladding is partially removed in the region of the surface of the half-block which, in use, is adjacent to the interaction surface of the selector member.

9. A filter as claimed in claim 6, wherein the half-coupler block is D-fibre half-coupler block, and a D-fibre constitutes the transmission medium, the D-fibre being positioned within the half-coupler block in such a manner that the flat of the D-fibre is substantially flush with that surface of the block which, in use, is adjacent to the interaction surface of the selector member.

10. A tunable grating comprising a coupler and a wavelength-selective arrangement as claimed in claim 1, wherein the wavelength-selective arrangement constitutes an overlay with respect to the coupler thereby to perturb the spatial beat frequency of the coupler.

11. A grating as claimed in claim 10, wherein the coupler is a planar waveguide coupler.

* * * * *